(12) United States Patent
Ogiwara

(10) Patent No.: US 6,831,683 B2
(45) Date of Patent: Dec. 14, 2004

(54) METHODS AND APPARATUS FOR PRINT CONTROL OF MOVING A POSITION OF A NON-PRINT AREA

(75) Inventor: Satoshi Ogiwara, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 227 days.

(21) Appl. No.: 10/291,424

(22) Filed: Nov. 12, 2002

(65) Prior Publication Data

US 2003/0095160 A1 May 22, 2003

(30) Foreign Application Priority Data

Nov. 22, 2001 (JP) ......................................... 2001-358181

(51) Int. Cl.$^7$ ............................ H04N 5/225; H04N 7/00; H04N 1/40
(52) U.S. Cl. ...................... 348/207.2; 348/552; 348/445; 348/372; 348/373; 348/374; 348/375; 348/376; 358/1.16; 358/1.2; 358/1.9
(58) Field of Search ................................. 348/372–376, 348/207.2, 552, 445; 396/310, 311, 429; 358/1.9, 1.2, 1.16, 296

(56) References Cited

U.S. PATENT DOCUMENTS

| 4,864,651 | A | | 9/1989 | Ogiwara et al. ............ 398/202 |
| 4,928,137 | A | * | 5/1990 | Kinoshita .................... 348/297 |
| 5,210,568 | A | * | 5/1993 | Miyake et al. ............... 396/303 |
| 5,313,305 | A | * | 5/1994 | Harigaya et al. ......... 348/211.8 |
| 5,557,443 | A | * | 9/1996 | Nakamura et al. ............. 398/30 |
| 5,784,105 | A | * | 7/1998 | Kawamura ................... 348/372 |
| 5,847,836 | A | | 12/1998 | Suzuki ........................ 358/296 |
| 6,191,814 | B1 | * | 2/2001 | Elberbaum ............. 348/211.14 |
| 6,552,821 | B2 | * | 4/2003 | Suzuki ........................ 358/1.9 |
| 6,580,460 | B1 | * | 6/2003 | Takahashi et al. ........... 348/372 |
| 6,710,809 | B1 | * | 3/2004 | Niikawa ..................... 348/372 |

FOREIGN PATENT DOCUMENTS

| EP | 0 862 313 A3 | 9/1998 |
| JP | 9-65182 | 3/1997 |
| JP | 10-243327 | 9/1998 |

* cited by examiner

Primary Examiner—Daniel J. Colilla
Assistant Examiner—Wasseem H. Hamdan
(74) Attorney, Agent, or Firm—Fitzpatrick, Cella, Harper & Scinto

(57) ABSTRACT

In a case where a digital still camera and a printer are connected to each other and marginless printing of an image stored on a memory card provided in the digital still camera is performed on a recording paper, a non-print area of the image not to be printed on the recording paper is displayed on a display of the digital still camera on the basis of a difference between an aspect ratio of the image and an aspect ratio of the recording paper, and the displayed non-print area is set to be able to be shifted in arbitrary directions by using an operation unit of the digital still camera.

9 Claims, 6 Drawing Sheets

RIGHT BUTTON DEPRESSION ↓  ↑ LEFT BUTTON DEPRESSION

RIGHT BUTTON DEPRESSION ↓  ↑ LEFT BUTTON DEPRESSION

RIGHT BUTTON DEPRESSION ↓  ↑ LEFT BUTTON DEPRESSION

RIGHT BUTTON DEPRESSION ↓  ↑ LEFT BUTTON DEPRESSION

METHODS AND APPARATUS FOR PRINT CONTROL OF MOVING A POSITION OF A NON-PRINT AREA

BACKGROUND OF THE INVENTION

1. Field of the Invention

The present invention relates to print control of moving a position of a non-print area when an image is printed.

2. Related Background Art

Conventionally, there is a line thermal transfer printer which uses a heat sensitive paper as a print paper, selectively drives plural heating elements arranged in the main scan direction, and performs printing like a dot line on the recording paper by transporting the recording paper in the sub scan direction.

In recent years, as input equipment such as a digital camera, a digital video camera, a scanner or the like which treats an image advances, a printer to which a thermal transfer method is applied is paid to attention as a print means.

That is, in an ink-jet printer, there are only binary options, i.e., one is to discharge ink droplets and the other is not to discharge ink droplets. Thus, the ink-jet printer intends to obtain apparent resolution and tonality by putting small ink droplets to a recording paper as controlling them in a method such as error diffusion method or the like. On the other hand, in the thermal transfer printer, since a controllable heat value can be easily changed in one pixel, a great number of tonalities can be set for one pixel. Thus, as compared with the ink-jet printer, the thermal transfer printer can obtain a smooth and high-quality image.

Moreover, since performance of a thermal head and performance of a recording paper material have been improved significantly, an image print of which finish quality does not pale beside that of a silver salt photograph can be obtained. For these reasons, the thermal transfer printer is paid to attention as a printer for a natural image in sync with the advancement of the digital camera in recent years.

On one hand, in the ink-jet printer, technique to reduce the size of an ink-droplet dot has advanced, whereby the printer capable of achieving higher-resolution printing also appears.

Consequently, for example, as shown in Japanese Patent Application Laid-Open No. 10-243327, a system in which such a printer as above is directly connected to a photographing apparatus such as a digital camera, a digital video camera or the like is proposed. Besides, as shown in Japanese Patent Application Laid-Open No. 9-65182, a system in which such a printer as above and a photographing apparatus are unified so that photographed image information is printed without a computer is also proposed.

However, in these conventional examples, in the case where the image photographed by the digital camera is directly printed out by the printer, when printing of no margin (i.e., marginless printing) is intended, this printing can be satisfactorily performed if an aspect ratio of a recording paper is the same as that of the image to be printed. On the other hand, if the aspect ratio of the recording paper is different from that of the image, it is necessary to perform the printing by cutting off a part of the image.

Thus, as a simple method to cope with such a case, there is a method to fix the portion to be cut off. For example, it is thought to decide to evenly cut off the top and bottom portions of the image without fail when this image is printed out. However, in this case, the top and bottom portions are indiscriminately cut off irrespective of the kind and content of the image, whereby there is possibly a fear that the portion intended to be really printed out is not printed.

Thus, it is intended to achieve a function, such as a function of an image processing application used in a personal computer, capable of designating an arbitrary area of the image on the digital camera. However, in such a case, operation members are limited as the digital camera becomes small in size, whereby a trouble that the printer becomes an interface which is complex and difficult for a user occurs. Therefore, there is a problem that the print system which is easy to be used for the user can not be provided in the conventional apparatus.

SUMMARY OF THE INVENTION

An object of the present invention is to provide a print control method and an image pickup apparatus capable of performing a print instruction, by which above-mentioned problems are dissolved.

Another object of the present invention is to provide a print control method and an image pickup apparatus capable of performing a print instruction, by which a user on the side of the image pickup apparatus can easily designate an area not to be printed on a recording paper.

Other objects of the present invention will become apparent from the following explanation based on the attached drawings and the appended claims.

DESCRIPTION OF THE PREFERRED EMBODIMENTS

Hereinafter, the embodiment of the present invention will be explained with reference to the accompanying drawings.

That is, a print system according to the embodiment will be explained with reference to FIGS. 1 to 4. The print system in the embodiment adopts a sublimation-type thermal transfer recording method for a printer unit and thus can print out electronic image information by a desired number of prints. Then, the print system will be explained according to a procedure. Incidentally, it should be noted that an ink-jet recording method or an electrophotographic recording method may be adopted for the printer unit.

Hereinafter, an example of an ordinary thermal transfer recording apparatus according to the embodiment will be concretely explained with reference to the drawings.

Figure 1:
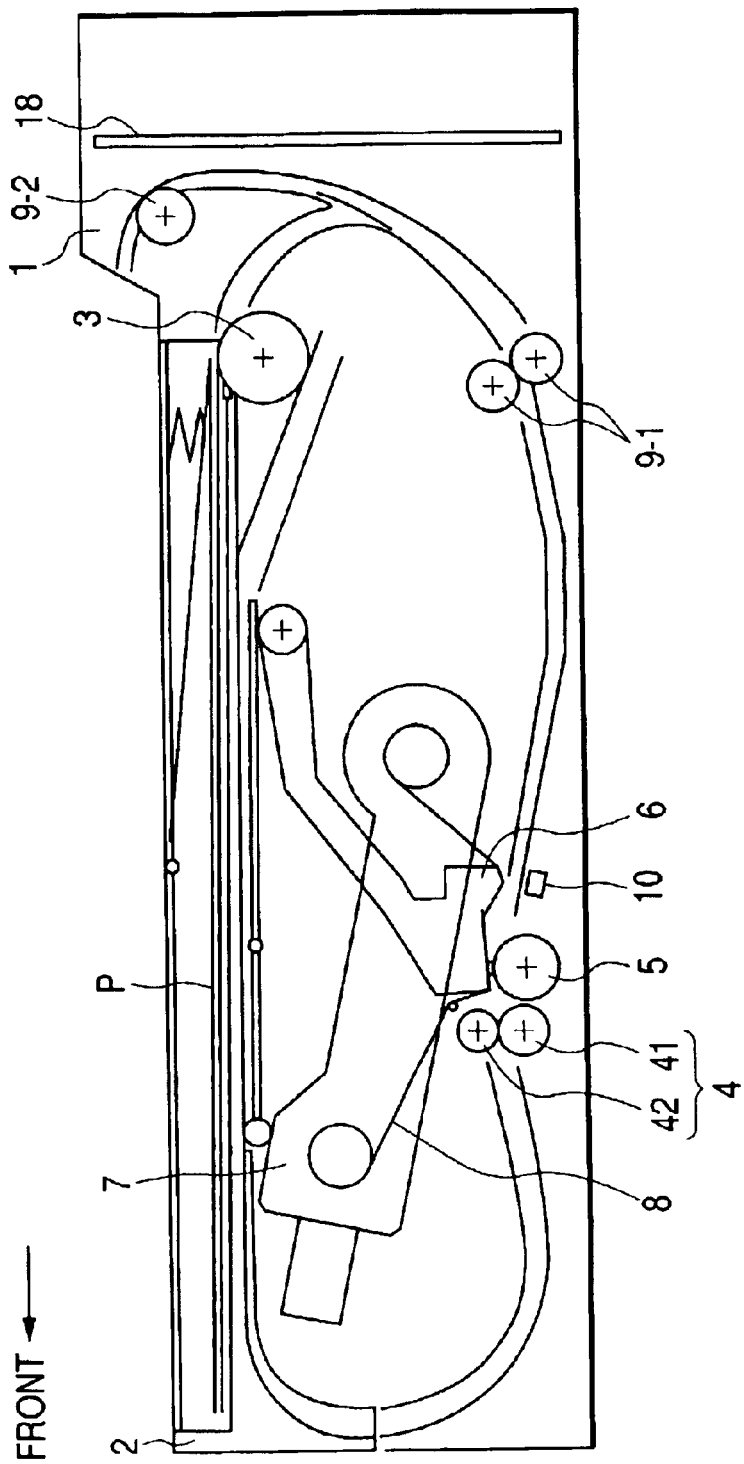
FIG. 1 is a schematic diagram showing the structure of a recording apparatus according to the embodiment of the present invention.

FIG. 1 is a schematic cross section diagram showing the structure of the recording apparatus according to the embodiment. First, the entire structure of the recording apparatus will be explained.

A recording paper P is separated, fed and transported one by one from a recording paper cassette 2 by a paper feeding roller 3.

Then, the recording paper P transported by the paper feeding roller 3 is nipped and transported by a pair of transportation rollers 4, whereby the recording paper P can be reciprocated in the recording unit. Here, it should be noted that the pair of transportation rollers 4 consist of a pinch roller 42 and a grip roller 41.

In the recording unit, a platen roller 5 and a thermal head 6 for generating heat according to recording information are opposite to each other through a recording paper transportation path. An ink sheet 8 held in an ink cassette 7 is pressed to the recording paper P and selectively heated by the thermal head 6, whereby a predetermined image is transferred and recorded onto the recording paper P, and also a protection layer is overcoated. Here, it should be noted that the ink sheet 8 includes an ink layer on which a heat melting ink or a heat sublimation ink has been applied, and also an overcoat layer that is to be overcoated on the printed face to protect it.

On the ink sheet 8, a yellow (Y) ink layer, a magenta (M) ink layer, a cyan (C) ink layer and an overcoat protection (OP) layer having the size substantially equivalent to a printing area size of the recording paper P are disposed. Thus, the ink of one layer is thermally transferred to the recording paper P, the recording paper P is returned to the recording start position, and the ink of another layer is then thermally transferred to the recording paper P. This operation is repeated for all the layers, whereby the respective inks are sequentially recoated on the recording paper P. In other words, by the pair of transportation rollers 4, the recording paper P is reciprocated the number of times corresponding to the number of ink and overcoat layers.

After the printing of each ink layer ended, the recording paper P is guided to first paper discharge rollers 9-1 and then to second paper discharge rollers 9-2. Thus, the recording paper P is discharged from the rear of a main body 1 of the apparatus toward the front thereof, and the recording operation ends.

Since the ordinary thermal transfer recording apparatus records images of Y, M and C three colors by three-time plane sequential recording, control is necessary to accurately register the leading edges of the recordings of the respective colors. For this purpose, it is necessary to firmly nip and transport the recording paper P by the pair of transportation rollers 4 shown in FIG. 1, whereby an unrecordable margin portion becomes necessary at the end of the recording paper P along the transportation direction.

Figure 3:
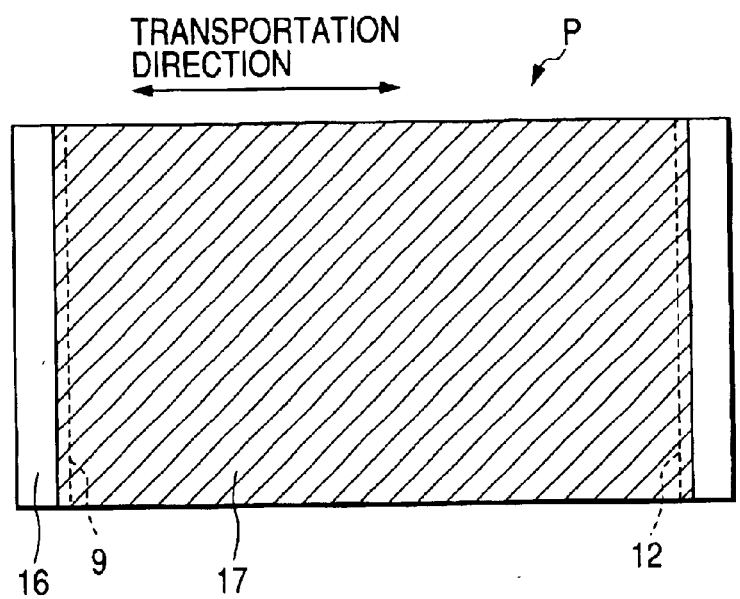
FIG. 3 is a diagram showing an example of a recording paper according to the embodiment.

On the ground of such a situation, in order to finally obtain a printed material having no margin easily, as shown in FIG. 3, perforations 9 and 12 are provided on the recording paper P so that a margin portion 16 on which any recording is impossible because it is firmly nipped by the pair of transportation rollers 4 can be manually cut off easily. Here, it is assumed that the embodiment is achieved by the recording paper P having the above perforations and the thermal transfer recording apparatus, and the perforation provided on the recording paper P is overcoated by the overcoat layer.

An area 17 indicated by the oblique lines shown in FIG. 3 is a printing area, and it is controlled that the printing is performed to the printing area including the perforations. Moreover, it is controlled that the overcoat layer is printed on the area on which the printing is substantially performed and which is slightly wider than the printing area.

Figure 2:
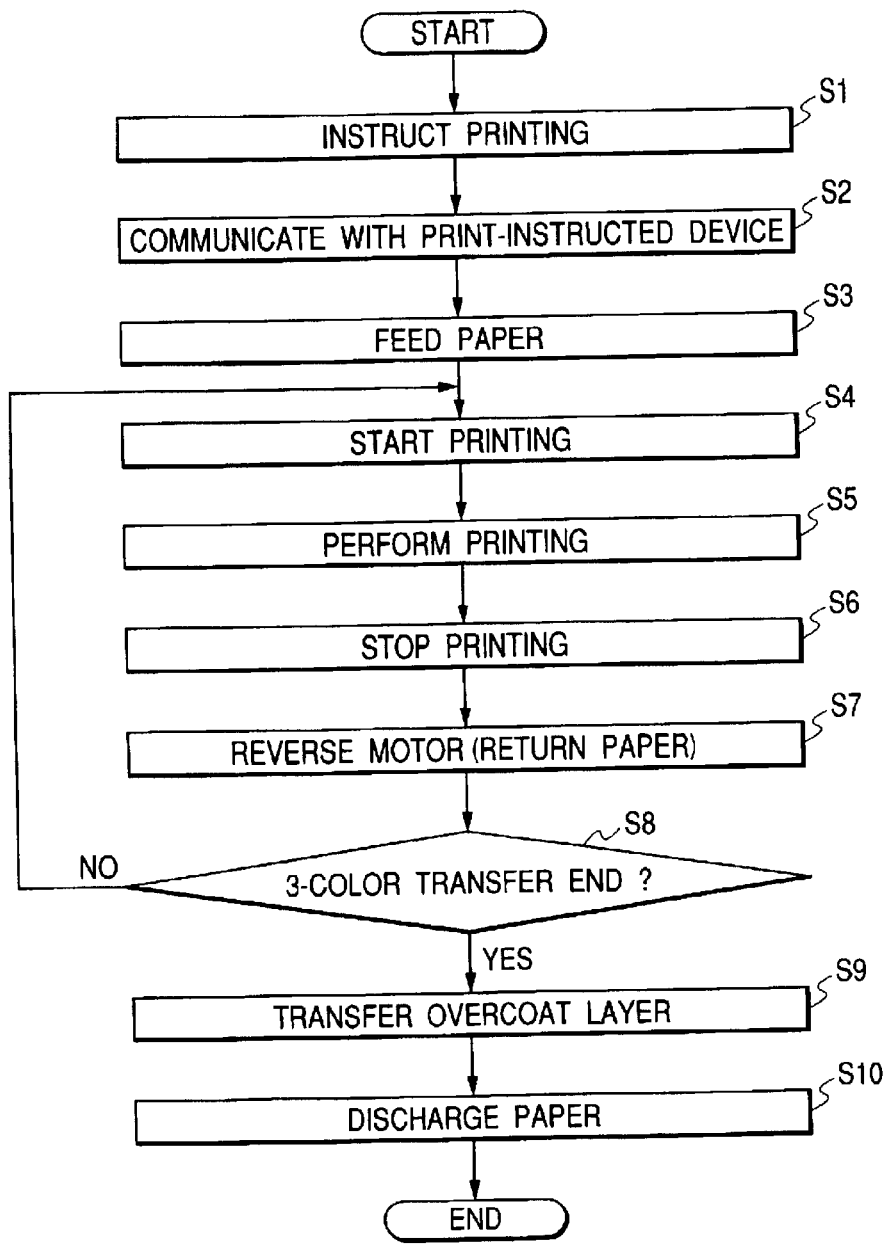
FIG. 2 is a flow chart for explaining an operation according to the embodiment.

Then, a color ink transfer and overcoating sequence will be explained with reference to a flow chart shown in FIG. 2.

First, in a first step S1, a print instruction is generated from a not-shown print button, a digital camera or a digital video camera by a user to designate a print target image and instruct a print operation of the print target image.

Next, in a step S2, a processing circuit 18 provided inside the main body 1 of the apparatus starts communication with the apparatus which has executed the print instruction. Then, the processing circuit 18 confirms various conditions necessary for the printing and informed by the apparatus which has executed the print instruction, and further performs if needed an image conversion process to convert the image information into print information.

Next, in a step S3, if the preparation for the printing ends, a control means (not shown) drives a motor connected to the paper feeding roller 3 and thus starts feeding the recording paper P. Then, in a step S4, if the leading edge of the recording paper P is detected, the control means rotates a stepping motor by predetermined steps to start printing the image. At this time, it is assumed that the image print start position is 12.465 mm based on the leading edge of the recording paper.

Consecutively, in a step S5, as the stepping motor is rotated by four steps, the printing of one line is performed by thermally driving the thermal head. In the embodiment, the stepping motor is rotated by 6,776 steps (corresponding to 1,694 lines) in total, and then the image printing ends. The image print end position at this time is 156.455 mm based on the leading edge of the recording paper.

Next, in a step S6, the stepping motor is rotated by 10 lines (corresponding to 40 steps) for deceleration until the motor stops, whereby the image printing stops. Next, in a step S7, from this situation, the stepping motor is reversely rotated to transport the recording paper P in the direction opposite to the direction in the image printing. Then, the stepping motor is returned by the predetermined number of steps (6,776 steps corresponding to the deceleration), and further rotated by the predetermined number of lines, i.e., 10 lines (corresponding to 40 steps) for further deceleration. After then, the stepping motor is stopped.

Next, in a step S8, the above operation is repeated three times for Y, M and C three colors, and it is then judged whether or not the desired printing image is transferred and printed on the recording paper P. If judged that the printing images of Y, M and C three colors are not yet transferred and printed on the recording paper P, the above processes in and after the step S4 are repeated. On the other hand, if judged in the step S8 that the printing images of Y, M and C three colors have been transferred and printed, then the flow advances to a step S9 to transfer the overcoat layer once to protect the printed face.

After then, in a step S10, the stepping motor is reversely driven to guide the recording paper P to the second paper discharge rollers 9-2, the guided recording paper P is discharged by the driving of the second paper discharge rollers 9-2, and a series of operations ends.

In the above operation, when the recording paper P is fed, the control means first controls the number of steps of the stepping motor on the basis of a leading edge detection signal of the recording paper P detected and supplied from a recording paper leading edge sensor 10. Then, when the entire image is printed, the control means further controls the number of steps of the stepping motor on the basis of the positional relation of the recording paper P in the transportation. As a result, the control means administrates the recording position.

However, the present invention is not limited to this. That is, when the Y, M and C color ink layers and the overcoat layer are transferred and recorded, the control means may detect the leading edge of the recording paper by providing a sensor at the leading edge of the recording paper, administrate the number of steps of rotation driving of the stepping motor based on such a detected signal, and thus administrate the recording position.

In the above description, the overcoat layer is transferred by only turning on and off the thermal driving of the thermal head. However, it is possible to control a heat value to gradually increase when the transfer of the overcoat layer starts, and to gradually decrease when the transfer of the overcoat layer ends.

Hereinafter, the apparatus for performing the print instruction in the step S2 and the communication by the print apparatus will be explained in detail. Here, a case where a digital camera DC performs the print instruction will be explained by way of example.

Figure 4:
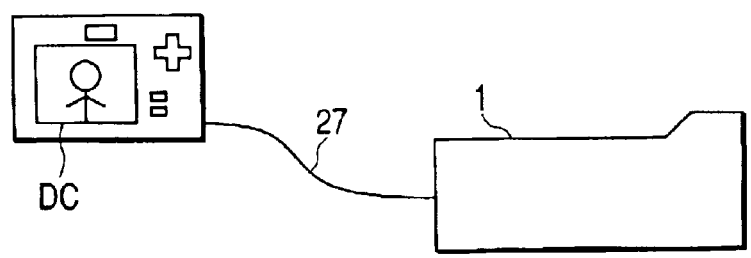
FIG. 4 is a diagram showing an example of the structure of a print system according to the embodiment.

FIG. 4 is a diagram showing an example of the structure of the print system that the digital camera DC and the main body 1 of the print apparatus are connected to each other.

Here, it is assumed that the image information obtained after the digital camera DC performs photographing is stored in a memory provided inside the digital camera DC. The memory may be a detachable memory such as CompactFlash(R) card, a smart media or the like. Moreover, it is assumed that a mode of the digital camera DC is set to reproduce an arbitrary image.

Since reproduction of the image information can be confirmed at any time on a liquid crystal display of the digital camera DC, a user can arbitrary fetches favorite photographed image information from the memory by using the operation unit of the digital camera DC. Here, if the digital camera DC is in the state capable of communicating with the main body 1 of the print apparatus through a cable 27 or a wireless means (not shown), the information necessary to perform a print operation is communicated from the digital camera DC to the print apparatus by using a predetermined print execution button (not shown) provided on the digital camera DC, whereby a print output can be obtained from the main body 1 of the print apparatus.

Here, information of negotiation between the digital camera DC and the main body 1 of the print apparatus, information representing an image sent from the digital camera DC and to be printed by the print apparatus, information added to the image information when or after the recording is performed, and the like can be applied as the information necessary to perform the print operation.

Here, the contents relative to the embodiment will be further explained in detail.

Figure 5:
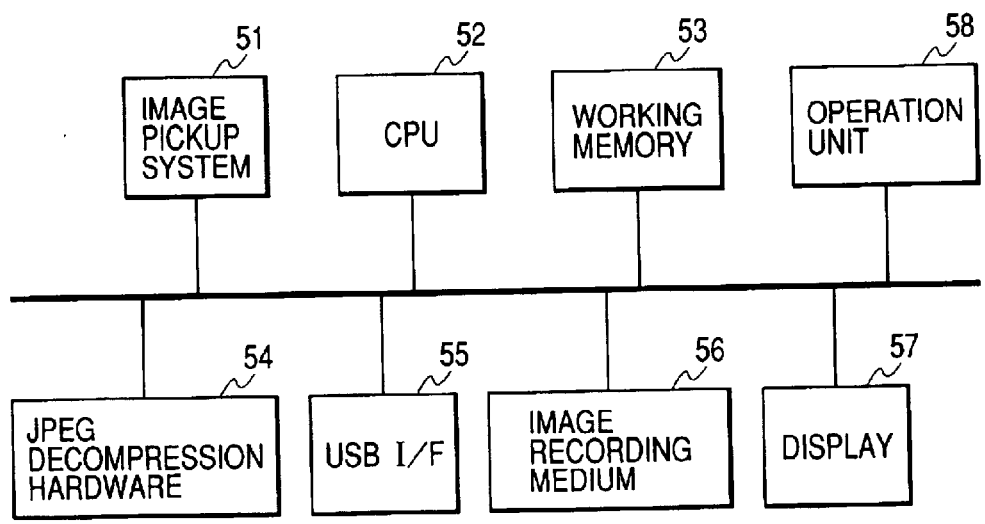
FIG. 5 is a block diagram showing an example of the structure of an image pickup apparatus according to the embodiment.

FIG. 5 is a block diagram showing an example of the structure of the digital camera DC. In FIG. 5, numeral 51 denotes an image pickup system which is used to the photographing, numeral 52 denotes a control CPU, numeral 53 denotes a working memory, numeral 54 denotes JPEG (Joint Photographic Experts Group) decompression hardware which is used to perform JPEG decompression, numeral 55 denotes a USB I/F (Universal Serial Bus Interface), numeral 56 denotes an image recording medium such as CompactFlash(R) or the like, numeral 57 denotes a display which displays an image, and numeral 58 denotes an operation unit which is used to issue various instructions. The digital camera DC that contains these structural components is connected to the print apparatus through the USB I/F 55.

Then, a case of actually printing the image will be explained.

Here, it is assumed that the image data to be printed has been previously stored in the image recording medium 56. First, the CPU 52 reads out a print-target JPEG image selected from the image recording medium 56 on the basis of the user's operation on the operation unit 58, expands the read-out image data on the working memory 53, and then causes the display 57 to display the image based on the expanded image data.

Next, if a print mode is selected, the CPU 52 indicates an address S#ADR0 of the data to be decompressed and the size thereof, an address S#ADR1 of the location on which the decompressed data is to be stored, and the like to the JPEG decompression hardware 54, and then instructs the JPEG decompression hardware 54 to actually start the decompression of the image data. The JPEG decompression hardware 54 performs the JPEG decompression, and then notifies the CPU 52 of the end of the decompression. Subsequently, the CPU 52 that received such a notification reads out the longitudinal and lateral sizes of the decompressed data from the JPEG decompression hardware 54, and then stores the read-out sizes on the working memory 53.

Next, the CPU 52 calculates an aspect ratio on the basis of the longitudinal and lateral sizes of the image, and then compares the calculated aspect ratio with an aspect ratio of the recording paper to be used for printing that image. Here, it should be noted that the longitudinal and lateral sizes of the selected image may be detected by using pixel number information included in header information of the JPEG image data, and the size of the recording paper may be obtained from the printer or determined on the side of the digital camera.

Moreover, it is assumed that the longitudinal size of the image is Gh, the lateral size of the image is Gw, the longitudinal size of the print recording paper is Ph, and the lateral size of the print recording paper is Pw. Then, in a case where Gh/Gw>Ph/Pw, in order to perform printing of no margin (marginless printing), the image data is output so that the lateral size of the image is enlarged or reduced in conformity with the width of the print recording paper.

Figure 6:
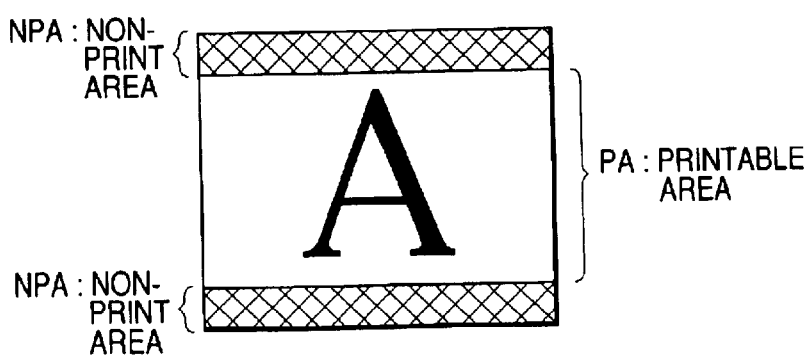
FIG. 6 is a diagram showing an example that the relation of an image and a print area according to the embodiment is displayed on a camera (the image is portrait)

FIG. 6 is a diagram showing an example that the relation of the image and the print area is displayed on the display 57 of the camera. In FIG. 6, hatching portions NPA indicate non-print areas which are cut off without any printing, and another portion PA indicates a printable area. In the embodiment, the printable area can be shifted by using the keys provided on the operation unit 58. As the key provided on the operation unit 58, even if it is impossible to use a cruciform key capable of arbitrary designating the up, down, right and left directions, it is possible to use a key capable of designating only the up and down directions or only the right and left directions. In the embodiment, it is assumed that the left button and the right button are provided on the operation unit 58.

Figure 7A:
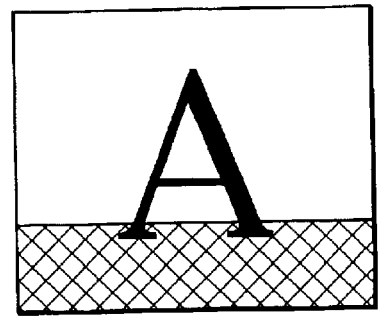
FIGS. 7A, 7B and 7C are diagrams showing an example that the print area is shifted (the image is portrait)
Figure 7B:
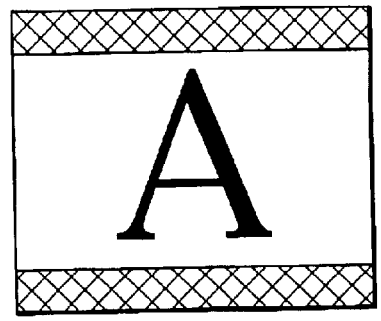
Figure 7C:
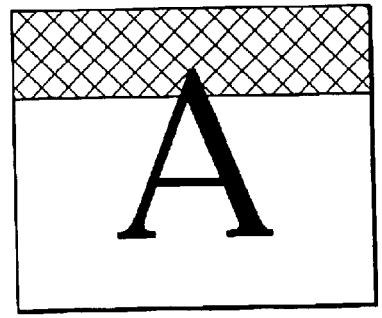

FIGS. 7A, 7B and 7C are diagrams showing the condition that the printable area is shifted by user's key operations.

Here, it is assumed that the position of the printable area PA is first in the state of FIG. 7B. In this state, the position of the printable area PA changes to the position being in the state shown of FIG. 7A if the left button is depressed, while the position of the printable area PA changes to the position being in the state of FIG. 7C if the right button is depressed. That is, the printable area PA shifts by a predetermined amount every time the left button or the right button is depressed, and the printable area PA continuously shifts if the user keeps depressing the button.

On the other hand, in a case where Gh/Gw<Ph/Pw, in order to perform the printing of no margin (marginless printing), the image data is output so that the longitudinal size of the image conforms with the height of the print recording paper.

Figure 8:
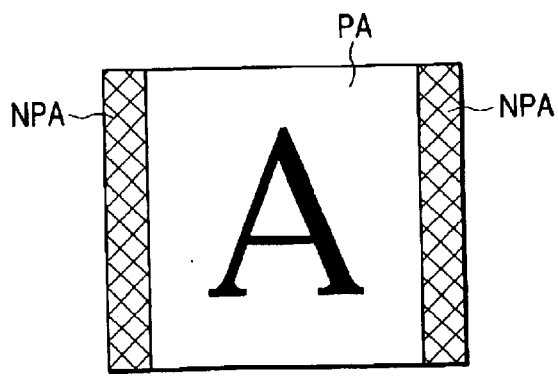
FIG. 8 is a diagram showing an example that the relation of the image and the print area according to the embodiment is displayed on the camera (the image is landscape)

FIG. 8 is a diagram showing an example that the relation of the image and the print area is displayed on the display 57 of the camera. In common with FIG. 6, the hatching portions NPA of FIG. 8 indicate the non-print areas that are cut off without any printing, and the portion PA of FIG. 8 indicates the printable area. Also in this case, it is assumed that the left button and the right button are provided on the operation unit 58.

Figure 9A:
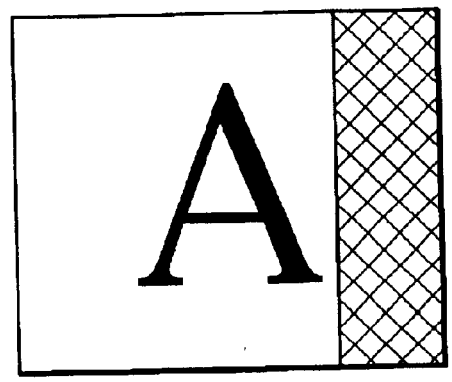
FIGS. 9A, 9B and 9C are diagrams showing an example that the print area is shifted (the image is landscape).
Figure 9B:
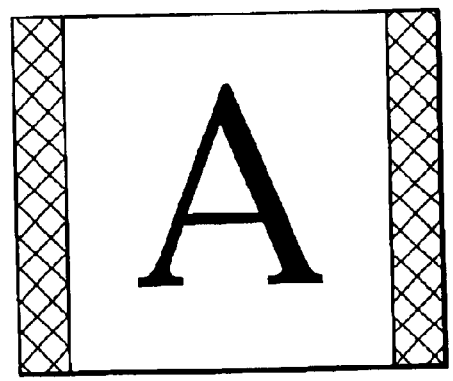
Figure 9C:
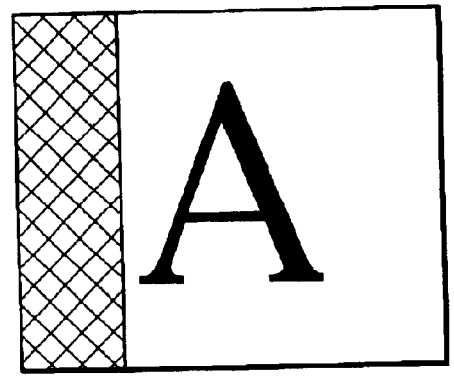

FIGS. 9A, 9B and 9C are diagrams showing the condition that the printable area is shifted by user's key operations.

Here, it is assumed that the position of the printable area PA is first in the state of FIG. 9B. In this state, the position of the printable area PA changes to the position being in the state shown of FIG. 9A if the left button is depressed, while the position of the printable area PA changes to the position being in the state of FIG. 9C if the right button is depressed. That is, the printable area PA shifts by a predetermined amount every time the left button or the right button is depressed, and the printable area PA continuously shifts if the user keeps depressing the button. The user sets the print area by the above operation, and then instructs the printer to start the printing to be able to obtain a desired printed material.

As explained above, in case of performing the printing of no margin (marginless printing), the area (non-print area) of the image that is not printed occurs due to the difference between the aspect ratio of the image and the aspect ratio of the recording paper. However, according to the embodiment, the function to display the non-print area on the camera is provided, and also the function to shift the non-print area by the operation member on the side of the camera is provided, whereby it is possible to select the print area intended by the user and then actually print the selected area by an easy operation.

Here, it should be noted that the present invention is not limited only to the marginless printing but is applicable to printing with margin (i.e., margin printing). That is, in case of performing the margin printing, the same effect as above can be achieved by comparing the aspect ratio of the substantial print area (i.e., the area from which the margin has been excluded) with the aspect ratio of the image.

Moreover, it should be noted that each of the above-explained means provided on the image pickup apparatus according to the embodiment is composed of a CPU or an MPU (microprocessor unit) of a computer, a RAM, a ROM and the like, whereby the function of each means can be achieved when programs stored in the RAM or the ROM operate.

Therefore, the program operating to cause the computer to achieve the above functions is recorded on a recording medium such as a CD-ROM, and the computer reads out the recorded program, whereby the above functions are actually achieved. As the recording medium for recording the program, in addition to the CD-ROM, it is possible to use a flexible disk, a hard disk, a magnetic tape, a magnetooptical disk, a non-volatile memory card or the like.

Moreover, in addition to the case where the computer executes the supplied program to achieve the functions of the embodiment, in a case where the program cooperates with an OS (operating system) or other application software operating on the computer to achieve the functions of the embodiment and a case where a function expansion board or a function expansion unit of the computer executes a part or all of the process based on the supplied program to achieve the functions of the embodiment, the programs in these cases are included in the embodiment of the present invention.

Moreover, in order to use the present invention in network environment, a part or all of the program may be executed in another computer. For example, an image screen input process may be performed on a remote terminal computer, and various discrimination, log recording and the like may be performed on another center computer or the like.

What is claimed is:

1. An image pickup apparatus comprising:
   an image pickup unit arranged to generate an image by converting an optical image of a subject to be photographed into an electrical image signal;
   a non-print area display unit arranged to display, when the image generated by said image pickup unit is printed on a recording paper, a non-print area not to be printed on said recording paper, on the basis of a difference between an aspect ratio of the generated image and an aspect ratio of said recording paper; and
   a non-print area shift unit arranged to shift the non-print area displayed by said non-print area display unit, in an arbitrary direction.

2. An image pickup apparatus according to claim 1, further comprising a non-print area discrimination unit arranged to automatically discriminate a case where the non-print area appears at the top and bottom of the image and a case where the non-print area appears at the right and left of the image,
   wherein said non-print area shift unit can shift the non-print area only in the directions discriminated by said non-print area discrimination unit.

3. An image pickup apparatus according to claim 1, further integrally comprising a print unit arranged to visibly print and output the image photographed by said image pickup unit, on said recording paper.

4. An image pickup apparatus according to claim 3, wherein said print unit includes a head on which plural heating elements are linearly arranged, and said head heats a color ink layer on which a color ink has been applied, whereby the color ink is transferred to said recording paper.

5. An image pickup apparatus according to claim 3, wherein said print unit is an ink-jet printer which discharges dots of recording liquid onto said recording paper to record characters or images thereon.

6. An image pickup apparatus according to claim 1, further comprising a display for displaying the image photographed by said image pickup unit,
   wherein said non-print area display unit causes said display to display the print-target image and the non-print area.

7. A print system comprising:
   an image pickup apparatus comprising,
      an image pickup unit arranged to generate an image by converting an optical image of a subject to be photographed into an electrical image signal, a non-print area display unit arranged to display, when the image generated by said image pickup unit is printed on a recording paper, a non-print area not to be printed on said recording paper, on the basis of a difference between an aspect ratio of the generated image and an aspect ratio of said recording paper, and a non-print area shift unit arranged to shift the non-print area displayed by said non-print area display unit, in an arbitrary direction, wherein the image photographed by said image pickup apparatus is visibly printed and output on the recording paper.

8. An image pickup method to be performed on the side of an image pickup apparatus, comprising:

an image pickup step of generating an image by converting an optical image of a subject to be photographed by an image pickup unit into an electrical image signal;

a non-print area display step of displaying, when the image generated in said image pickup step is printed on a recording paper, a non-print area not to be printed on the recording paper, on the basis of a difference between an aspect ratio of the generated image and an aspect ratio of the recording paper; and a non-print area shift step of shifting the non-print area displayed in said non-print area display step, in an arbitrary direction.

9. An image pickup method according to claim 8, further comprising a non-print area discrimination step of automatically discriminating a case where the non-print area appears at the top and bottom of the image and a case where the non-print area appears at the right and left of the image, wherein, in said non-print area shift step, the non-print area can be shifted only in the directions discriminated in said non-print area discrimination step.

* * * * *